United States Patent [19]

Bechtold

[11] 3,762,940

[45] Oct. 2, 1973

[54] HEXA(ALKOXYMETHYL)MELAMINE-MODIFIED HYDROXYLATED FLUOROPLYMER COATED ARTICLES

[75] Inventor: Max F. Bechtold, Kennett Square, Pa.

[73] Assignee: E. I. du Pont de Nemours and Company, Wilmington, Del.

[22] Filed: Sept. 9, 1971

[21] Appl. No.: 179,116

Related U.S. Application Data

[62] Division of Ser. No. 784,648, Dec. 18, 1968, Pat. No. 3,651,000.

[52] U.S. Cl. ........... 117/76 F, 117/75, 117/132 CF, 117/138.8 A, 117/138.8 F, 117/138.8 UA
[51] Int. Cl. ...................... B32b 15/08, B32b 27/08
[58] Field of Search ...................... 260/87.5 A, 853, 260/856, 31.2 R; 117/138.8 A, 138.8 F, 138.8 UA, 76 F, 161 UN, 161 LN, 132 CF, 75

[56] References Cited
UNITED STATES PATENTS

| | | | |
|---|---|---|---|
| 3,429,846 | 2/1969 | Bechtold et al. | 117/138.8 |
| 3,159,610 | 12/1964 | Slocombe et al. | 260/87.5 |
| 2,468,664 | 4/1949 | Hanford et al. | 260/87.5 |
| 3,356,628 | 12/1967 | Smith et al. | 260/853 |
| 3,446,784 | 5/1969 | Kao | 260/856 UX |
| 3,471,388 | 7/1969 | Koral et al. | 260/856 |
| 3,084,136 | 4/1963 | Chapin et al. | 260/853 |
| 3,269,994 | 8/1966 | Horn et al. | 260/856 |
| 3,284,394 | 11/1966 | Suen et al. | 260/856 |
| 3,364,060 | 1/1968 | Welzel et al. | 260/856 |
| 3,533,977 | 10/1970 | Read | 260/853 X |

*Primary Examiner*—William D. Martin
*Assistant Examiner*—Harry J. Gwinnell
*Attorney*—Herbert W. Larson

[57] ABSTRACT

Described and claimed are combinations of certain hydroxylated fluoropolymers and hexa(alkoxymethyl)-melamines, both in the form of crosslinkable liquid mixtures and in the form of scratch-resistant, strongly adherent cross-linked coatings, methods of applying the coatings from the liquid mixtures, and solid objects, especially plastic objects, carrying the coatings.

7 Claims, 2 Drawing Figures

INVENTOR
MAX F. BECHTOLD

BY *Herbert W. Larson*

ATTORNEY

3,762,940

HEXA(ALKOXYMETHYL)MELAMINE-MODIFIED HYDROXYLATED FLUOROPLYMER COATED ARTICLES

BACKGROUND AND SUMMARY OF THE INVENTION

This application is a division of my copending application Ser. No. 784,648, filed Dec. 18, 1968 and now U.S. Patent 3,651,003.

FIELD OF THE INVENTION

This invention relates to, and has as its principal objects provision of, novel coating compositions (certain hydroxylated fluoropolymers admixed with hexa(alkoxymethyl)-melamine and, in one embodiment, containing silica as polysilicic acid) which can be readily applied to solid objects and cured thereupon to produce adherent, scratch-resistant coatings, the coatings themselves and solid objects carrying the coatings.

DESCRIPTION OF THE PRIOR ART

Hydroxyl-containing fluoropolymers are known (see U. S. Pat. Nos. 2,468,664 and 3,159,610 for hydroxyl-containing copolymers of tetrafluoroethylene) as are their complexes with silica, useful as coatings (see the copending, coassigned, U. S. applications of Bechtold and Brasen, Ser. No. 464,064 now U.S. Pat. No. 3,429,846; Bechtold and Fawcett, Ser. No. 464,063 now U.S. Pat. No. 3,429,845; Engelhardt Ser. Nos. 464,184 and 593,072 now U.S. Pat Nos. 3,476,827 and 3,514,425, respectively; and Engelhardt U. S. Pat. No. 3,390,203).

Hexa(alkoxymethyl)melamines, as well as the related urea/formaldehyde and melamine/formaldehyde resins (see Payne, Organic Coating Technology, John Wiley and Sons, New York [1954]) in combination with hydroxyl-containing polymers, including cellulosics, epoxies, acrylics and vinyls, have been disclosed as compositions for use in coatings. Melamine/— or urea/formaldehyde resins have also been employed alone as surface coatings for transparent plastics (Barnes, U. S. Pat. No. 2,481,809; Cooper, U. S. Pat. No. 2,575,998; Nickerson, U. S. Pat. No. 2,589,567; Nadeau and White, U. S. Pat. No. 2,632,715; Kamath and Buzzell, Plastics Technology 4, 132-6 152 [1958]). Resins formed from hydroxylated copolymers carrying fluorine in dependent groups cross-linked with hexa(methoxymethyl)melamine are mentioned in Smith and Sherman, U. S. Pat. No. 3,356,628.

In accordance with the present invention, it has been found that certain hydroxylated polymers carrying fluorine on the polymeric chain can be crosslinked with hexa(alkoxymethyl)melamines to give hard coatings generally useful on solid substrates, plastics in particular. The durability of the substrate is improved because of the scratch- and chemical resistance of the coatings. The crosslinked materials are very clear or transparent (unless pigmented), and have excellent adhesion to the substrates. The hexa(alkoxymethyl)melamine-containing hydroxylated fluoropolymer compositions can also be used as primer coatings upon which coatings of silica-containing hydroxylated fluoropolymers, which are somewhat more scratch resistant, can subsequently be laid down with greatly improved adhesion. The primer coatings are particularly valuable with transparent plastics such as the bisphenol A polycarbonates (Lexan or Merlon) and poly(ethylene terephthalate) (Mylar) to which the silica compositions have poor adhesion. The coatings can also serve as vehicles for carrying ultraviolet absorbers and pigments.

Hexa(alkoxymethylmethyl)melamine can less preferably be added to the silica-containing hydroxylated fluoropolymers of the type mentioned above, or substituted for some of the silica therein, to improve to some extent the adhesion of the polymeric coating on plastics upon weathering.

The preferred hexa(alkoxymethyl)melamine for use in this invention is the commercially available hexa(methoxymethyl)melamine (see the trade literature of the American Cyanamid Company on Cymel 300 or 301), but others can be used as well.

DESCRIPTION OF THE DRAWINGS

The invention will be understood in more detail from the remainder of the specification and from the drawings in which.

DETAILS OF THE INVENTION

Figure 1:
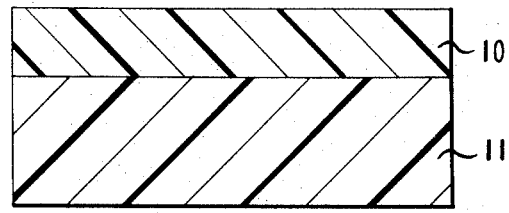
FIG. 1 represents an embodiment of the invention in which a coating 10 of a hydroxylated fluoropolymer cross-linked with a hexa(alkoxymethyl)melamine is present on a substrate 11 which may be of plastic or other solid material such as iron, copper or other metal.
Figure 2:
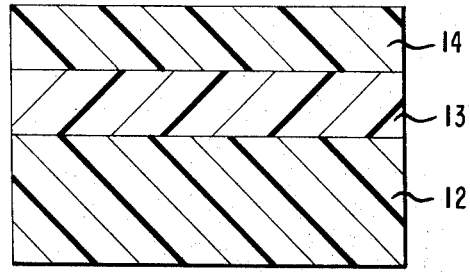
FIG. 2 represents a preferred embodiment of the invention in which a plastic polycarbonate substrate 12 carries an intermediate layer or primer coating 13 of a crosslinked hydroxylated fluoropolymer of the invention, e.g., (tetrafluoroethylene/4-hydroxybutyl vinyl ether copolymer)/-hexa(methoxymethyl)melamine, promoting the adhesion of a coating 14 of a (tetrafluoroethylene/4-hydroxybutyl vinyl ether copolymer)/silica to a polycarbonate substrate.

It will be evident that the present invention has several aspects. The hexa(alkoxymethyl)melamine-crosslinked polymers of preformed fluoropolymers carrying hydroxyl groups, used as coating materials, constitute one aspect of the invention. Mixtures of the crosslinkable copolymers with the crosslinking agents, in suitable solvents or carriers, constitute another aspect of the invention, i.e., coating baths which can be contacted with the desired substrate. After contact with the substrate and evaporation of solvent, the residual solid can be crosslinked, generally in the presence of an acid catalyst, to provide the coating for the substrate. Both the coating process and the coated substrates form additional embodiments of the invention.

In its composition of matter aspects, the coating material which is the principal basis of the present invention comprises broadly (1) a preformed crosslinkable fluoropolymer in which the fluorine atoms are attached to carbons in the main polymer chain (backbone) and which contain hydroxyl groups and (2) a hexa(alkoxymethyl)melamine of the formula $(ROCH_2)_6C_3N_6$, where R is alkyl, including cycloalkyl, of 1–8 carbon atoms and $C_3N_6$ represents the melamine nucleus. In the liquid mixtures comprising the coating solutions, the preformed crosslinkable copolymer and the hexa(alkoxymethyl)melamine exist as such. In the ultimate coating itself, the copolymer is crosslinked through the hexa(alkoxymethyl)melamine. The coating compositions, exclusive of solvents and other additives, may be defined more specifically as comprising 5–45 percent by weight of a hexa(methoxymethyl)- melamine and 95–55 percent by weight of a compatible fluoropolymer carrying a plurality of hydroxyl groups, each attached to a carbon atom carrying at least one hydrogen, the fluoropolymer containing at least about 20 percent by weight of fluorine attached to the carbon chain of the polymer and having a unit weight no greater than 700 per hydroxyl group.

The preferred hydroxylated fluoropolymers used as basic constituents of the present coating compositions are essentially copolymers of fluoroolefins with hydroxyl-containing vinyl-type monomers, or copolymers hydrolyzable thereto. Most preferred are copolymers of tetrafluoroethylene and chlorotrifluoroethylene (1) with hydroxyalkyl vinyl ethers, which yield alternating (and hence 1:1) copolymers, (2) with olefinic alcohols, or (3) with vinyl esters, the ester group being converted to hydroxyl after copolymerization. Hydroxyalkyl vinyl ethers suitable for copolymerizing with tetrafluoroethylene or chlorotrifluoroethylene include 2-hydroxyethyl vinyl ether, 2-hydroxypropyl vinyl ether, 4-hydroxybutyl vinyl ether, 5-hydroxypentyl vinyl ether, and 6-hydroxyhexyl vinyl ether as well as the monovinyl ethers of diethylene glycol, 1,4-cyclohexanediol and cyclohexanedimethanol. Copolymers of tetrafluoroethylene and 4-hydroxybutyl vinyl ether are preferred. The preparation of the vinyl ethers and their copolymerization with tetrafluoroethylene are described in the above-mentioned application Bechtold and Fawcett, Ser. No. 464,063. A process for the preparation of such copolymers has also been described in U. S. Pat. No. 3,159,610.

Copolymers of tetrafluoro- and chlorotrifluoroethylene with olefinic (allylic) alcohols such as allyl alcohol and 2-methyl-2-propene-1-ol and their preparation are described in the above-mentioned application of Engelhardt Ser. No. 583,072. Another olefinic alcohol suitable for the copolymerization is 3-butene-1-ol. Proportions of fluoroolefin/olefinic alcohol components in the copolymers depend on the proportions of the corresponding monomers charged in the copolymer preparation. It is preferred that the fluoroolefin proportion in the copolymer be sufficient to provide a fluorine content of about 20 percent or more by weight.

Hydrolyzed fluoroolefin/vinyl acetate copolymers are modified polyvinyl alcohols, and their preparation is described in the above-mentioned U. S. Pat. No. 2,468,664 and the Bechtold and Brasen application Ser. No. 464,064. Hydrolyzable copolymers from which hydroxylated fluoropolymers can be obtained include copolymers of fluoroolefins with vinyl esters or esters of olefinic alcohols. The preferred fluoroolefins are tetrafluoroethylene and chlorotrifluoroethylene and the preferred esters are vinyl acetate, allyl acetate and 2-methyl-2-propenyl acetate. The proportions of fluorinated moiety and ester in the copolymer depend on the proportions of the monomers charged in their preparation. The preferred proportions are again those which provide a fluorine content of about 20 percent or more by weight in the hydrolyzed copolymer. The reaction between the fluorinated monomer and the olefinic ester is carried out first, and the acyl moieties of the ester groups are hydrolyzed off subsequently. Hydrolysis of the copolymers is readily accomplished by the method described in U. S. Pat. No. 2,419,009, Example VI.

The hexa(alkoxyalkyl)melamine crosslinking agents for the hydroxylated fluoropolymers have the general formula $(ROCH_2)_6C_3N_6$ in which $C_3N_6$ represents the melamine nucleus and R is an alkyl, including cycloalkyl, group of 1-8 carbon atoms. Representative R groups are methyl, ethyl, propyl, isopropyl, n-butyl, isobutyl, n-hexyl, n-octyl, 2-ethylhexyl, 4-methylheptyl, cyclopropyl, cyclobutyl, cyclopentyl and 3-methylcyclohexyl. As noted above, hexa(methoxymethyl)melamine, the preferred melamine component, is available commercially, and the other hexa(alkoxymethyl)melamines are readily prepared from it by ether interchange according to the procedure shown below in Example 7, Part A.

The crosslinked compositions produced from the hydroxylated fluoropolymers and the hexa(alkoxymethyl)-melamines are hard insoluble materials which, in the form of coatings, have a unique combination of excellent adhesion and scratch-resistance when prepared according to the process of the invention. Crosslinking is accomplished by heating the crosslinkable compositions, preferably in the form of substantially solvent-free, thin coatings. The crosslinking reaction occurs by formation of ether linkages through acid-catalyzed reaction between hydroxyl groups of the hydroxylated fluoropolymer and alkoxymethyl groups of the hexa(alkoxymethyl)melamine. The reaction involves elimination of the alcohol corresponding to the alkoxy group according to the following reaction scheme:

Polymer—OH + Alk—OCH$_2$—Melamine

Polymer—OCH$_2$—Melamine + Alk—OH.

The characteristic structural features of the crosslinks and the crosslinked polymer can be represented by the following formula showing six fluoropolymer chains (FPC) joined through a melamine nucleus by six ether linkages:

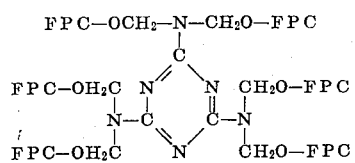

Since both the fluoropolymer and the hexa(alkoxymethyl)melamine are polyfunctional in hydroxyl and alkoxymethyl groups, respectively, various combinations of interattachment are possible, including the possibility of more than one ether linkage between a single polymer chain and a single melamine nucleus. However, true crosslinking is assured because spatial restrictions foster preponderant formation of ether linkages between a given melamine nucleus and a plurality of fluoropolymer chains. Maximum theoretical crosslink density is achieved by complete reaction in the above-indicated proportion of one-sixth of a mole of the hexa(alkoxymethyl)melamine per mole of hydroxyl group in the fluoropolymer. In terms of weight ratio, suitable proportions of the hexa(methoxymethyl)melamine/-(tetrafluoroethylene/4-hydroxybutyl vinyl ether) compositions are 5–45 percent of the melamine and 95–55 percent of the hydroxylated fluoropolymer. These figures correspond to a hexa(alkoxymethyl)- melamine/hydroxyl group mole ratio range of 1/34 to ½. The preferred range is 1/10 to ⅓. Useful ratios for other hexa(alkoxymethyl)melamines and other hydroxylated fluoropolymers are in the same molar range.

The hardness of the coatings is basically dependent on the relative density of crosslinking, i.e., the greater the number of crosslinks per unit weight of the coating, the harder the coating. There is, consequently, a practical upper limit to the weight of the hydroxylated fluoropolymer per hydroxyl group. For topcoats this limit is estimated on the basis of steel wool scratch tests to be an equivalent weight of about 400 per hydroxyl group. For undercoatings (primer layers), a somewhat lower cross-link density is acceptable, and equivalent weights per hydroxyl of up to about 700 are judged to be useful.

Adhesion of the coatings to solid substrates, especially acrylic polymers, is strongly influenced by both the fluorine content and the structure of the hydroxylated fluoropolymer. Adequate adhesion is obtained when the fluorine content of the polymer is about 20 percent or more by weight, provided the fluorine is attached to the carbon chain of the polymer. Fluorine on a side chain, e.g., a perfluoromethyl group, appears to be detrimental to achieving the best coating properties. On the other hand, the hydroxyl group on the hydroxylated portion of the copolymer may be primary or secondary on a chain pendent to the carbon chain of the copolymer, or may be secondary and attached directly to the polymer backbone. If the hydroxyl is on a pendent chain, there is impairment of adhesion if the chain is longer than about seven atoms.

As noted, hexa(alkoxymethyl)melamines in general are operable as the crosslinking agent for the hydroxylated fluoropolymers in the compositions of this invention. However, since the alkoxy group is split off as the corresponding alcohol during the curing step, it is essential that the curing temperature be sufficiently high and/or the curing time be sufficiently long to volatilize the alcohol so that it does not remain behind to soften the coating. Most of the plastic substrates of interest for the application of scratch-resistant coatings are preferably not heated above about 200°C. For this reason, hexa(alkoxymethyl)-melamines in which the alcohol corresponding to the alkoxy group boils below 200°C. are preferred. Such alcohols generally contain about 1–8 carbon atoms.

The optimum ratio of hexa(alkoxymethyl)melamine to hydroxylated fluoropolymer, as indicated above, is close to the theoretically required one-sixth of a mole of the hexa(alkoxymethyl)melamine per mole of hydroxyl group in the polymer. In the preferred compositions based on hexa(methoxymethyl)melamine and tetrafluoroethylene/4-hydroxybutyl vinyl ether copolymer, the theoretical weight ratio is about 23/77 hexa(methoxymethyl)melamine/(tetrafluoroethylene/4-hydroxybutyl vinyl ether),and optimum coatings are found in the weight ratio range of 20/80 to 30/70. Equivalent weight ratios of other hexa(alkoxymethyl)-melamines to other hydroxylated fluoropolymers are the generally preferred compositions. Useful coatings can be obtained above and below such weight ratios; but in general as the hexa(alkoxymethyl)melamine concentration drops significantly below the preferred range the hardness of the coatings also drops off, and when the hexa(alkoxymethyl)-melamine concentration is much above the preferred range, adhesion, especially in hot water, is adversely affected.

Although many other melamine derivatives, e.g., methylated, butylated, isobutylated, etc., melamine-formaldehyde reaction products, are widely used as crosslinking agents, none of these materials in conjunction with the hydroxylated fluoropolymers has given the combination of scratch resistance and adhesion to poly(methyl methacrylate) that is obtained with the hexa(alkoxymethyl)melamines.

Similarly, compositions formed from hexa(methoxymethyl)melamine and hydroxyl-containing copolymers without fluorine on the main chain give coatings that do not have the required combination of excellent scratch resistance and excellent adhesion, e.g., to poly(methyl methacrylate). Such copolymers include the following: ethyl acrylate/2-hydroxyethyl vinyl ether, vinyl acetate/2-hydroxyethyl vinyl ether, methyl methacrylate/2-hydroxyethyl methacrylate, methacrylic ester of fluorinated alcohol/2-hydroxyethyl methacrylate, polyvinyl propional, the polyvinal acetal of 5-hydroxypentanal, etc.

The crosslinkable compositions of the invention are conveniently formulated and conveyed in solutions, which form an important aspect of the invention. Suitable solutions contain about 5–20 percent by weight of hydroxylated fluoropolymer and about 0.25–10 percent by weight of hexa(methoxymethyl)melamine (or contain an equivalent amount of hexa(alkoxymethyl)-melamine). In general, solutions containing a total of 10–15 percent by weight of fluoropolymer plus hexa(alkoxymethyl)melamine are most useful for clear coatings. At higher concentrations, solutions tend to gel in a short time. Solutions containing hexa(alkoxymethyl)melamines and crosslinkable hydroxylated fluoropolymers are usually made up in an alcohol together with ketone, ester or aromatic hydrocarbon solvents. The compositions develop their useful properties as coatings through the crosslinking reaction between the hexa(alkoxymethyl)melamines and the hydroxylated polymers after evaporation of the solvent. A small amount of strong acid (suitably about 0.02–1.0 percent by weight in the solution), or latent strong acid (e.g., a salt that dissociates at an elevated temperature), is required as a catalyst for the crosslinking reaction. The free acid generally causes solutions in solvents other than alcohols to gel by premature crosslinking. Solutions which have gelled are found to be quite undesirable as coating materials.

Gelation in the solution can be prevented by neutralizing the acid with an appropriate amine, e.g., morpholine, 2-amino-2-methyl-1-propanol, etc., to give a salt that dissociates at the elevated temperature used for curing. However, the cured coatings must normally have good adhesion to their solid substrates, and best adhesion requires the additional presence of 10–35 percent by weight of acetic acid in the solutions from which they are applied. The acetic acid requirement weakens the solution-stabilizing effectiveness of the amine; but if the solvent system always includes a substantial amount of a primary alcohol, the coating solution is stable even in the absence of the amine. The preferred proportion of primary alcohol is in the range 25–35 moles per mole of hydroxyl in the hydroxylated polymer.

Suitable and representative solvents for use in making the coating solutions of the invention include lower aliphatic alcohols such as methanol, ethanol, n-butyl alcohol, isopropyl alcohol, etc., and lower aliphatic ketones such as acetone, methyl ethyl ketone, methyl isobutyl ketone and methyl isoamyl ketone. Ether alcohols (Cellosolve) and their esters and aromatic hydrocarbons such as toluene and xylenes are useful additions to the solvent system in minor amounts. Small amounts of water may also be present.

In addition to the basic components, i.e., the hydroxylated fluoropolymer and the crosslinking hexa(alkoxymethyl)melamine, the coating solutions may contain additional materials, some of which do not remain in the ultimate coating and some of which do, e.g., antisilking agents such as organosilicone (a block copolymer of one or more lower alkylene oxides with dimethyl siloxane; see the abovementioned Engelhardt application Ser. No. 464,184 now U.S. Pat. No. 3,476,827), and light stabilizers such as the various classes of ultraviolet absorbers (benzotriazoles, hydroxybenzophenones, salicylates, substituted acrylonitriles, etc.; see the article by J. A. Weicksel and J. F. Hosler, *Modern Plastics Encyclopedia*, p. 410 [1964]).

The absorbers of ultraviolet light are retained by the fluoropolymer after it is crosslinked and provide valuable protection against light degradation. Solutions and coating compositions containing ultraviolet absorbers constitute important aspects of this invention, particularly where the crosslinked fluoropolymers are employed as adherent primer coatings for the more scratch-resistant but less adherent silica-containing polymers. Specific absorbers of ultraviolet light include: 2(2'-hydroxy-5'-methylphenyl)-benzotriazole, 2-hydroxy-4-methoxy-2'-carboxybenzophenone, 4-dodecyloxy-2-hydroxybenzophenone, ethyl 2-cyano-3,3-diphenylacrylate, etc. These are effective to improve longterm weatherability, particularly of transparent coatings on plastics, by reducing light-induced degradation of the substrate interface. Generally about 0.5–3 percent by weight of an ultraviolet absorber will be used in solution resulting in an effective light-stabilizing amount of about 1–5 percent in the final coating.

The solutions can also serve as vehicles for pigmented or dyed finishes for automotive or appliance use. Like the ultraviolet absorbers, the pigment remains entrapped by the resulting crosslinked fluoropolymer, and, in effect, provides an enamel yielding a very desirable finish. Any pigment ordinarily used in opaque finishes is suitable, e.g., titanium dioxide, carbon black, any of the metal phthalocyanines, iron oxide, white lead, zinc chromate and aluminum flake. The quantity of pigment employed in any solution can vary widely but will generally be in the range of about 7–22 percent by weight, resulting in about 10–30 percent in the final coating. The solution in Example 16, below, contained 11.4 percent by weight of $TiO_2$, yielding a coating containing 16 percent of $TiO_2$.

Solutions described more fully in the representative examples below contained, as major components and solvents, from about 6 to about 16 percent by weight of hydroxylated fluoropolymer, from about 2 to about 8 percent of hexa(alkoxymethyl)melamine, from about 36 to about 88 percent of one or more alcohols (methanol, ethanol, n-butyl alcohol, t-butyl alcohol, methyl Cellosolve), up to about 19 percent of ketone (acetone, methyl isoamyl ketone), up to about 18 percent of toluene and up to about 35 percent of acetic acid.

Minor ingredients are evident in the examples themselves or in the discussion above.

The process aspect of the invention, in which the liquid compositions containing all the desired components are applied as coatings to solid surfaces, includes conventional steps, e.g., dipping, flowing, swabbing, printing, roller coating, doctoring, spinning, brushing or spraying. The wet coatings are dried by evaporating the solvents, and the coated surfaces are baked under appropriate time-temperature schedules to crosslink (cure) the coatings (evaporation and baking are generally combined in a single step). In the presence of very active catalysts such as hydrochloric acid (added to the original solution), curing takes place when the coating is dried at room temperature. However, coatings of improved adhesion are obtained when nonvolatile acids, e.g., p-toluenesulfonic acid, are used and curing takes place at 100°–170°C. in periods ranging from 5 minutes to several hours (for the low temperatures). In general, best results are obtained with cures in which the temperature is held at about 135°–150°C. for 10–120 minutes.

The hexa(methoxymethyl)melamine/hydroxylated fluoropolymer compositions have certain beneficial qualities for coatings in combination with silica compositions of the type described at length in the abovementioned applications Ser. No. 464,063 now U.S. Pat. No. 3,429,845, Ser. No. 464,064 now U.S. Pat. No. 3,429,846, and Ser. No. 583,072 now U.S. Pat. No. 3,514,425. The combination coatings can be single-layer or preferably double-layer. Single-layer coatings are made from mixtures in which the different components can be present in any proportion. Preferred portions are those having a preponderance of either hexa(alkoxymethyl)melamine or polysilicic acid (calculated as silica, $SiO_2$) as the crosslinking agent for the hydroxylated fluoropolymer. When the hexa(alkoxymethyl)melamine is present in minor amounts, e.g., as in 27/3/70 $SiO_2$/hexa(methoxymethyl)melamine/(tetrafluoroethylene/4-hydroxybutyl vinyl ether), the melamine derivative gives greater resistance to weathering as determined by a Weather-Ometer exposure. When the polysilicic acid is present in minor amounts, e.g., as in 5/27.5/67.5 $SiO_2$/hexa(methoxymethyl)melamine/(tetrafluoroethylene/4-hydroxybutyl vinyl ether), the coating has slightly better scratch resistance than in the absence of silica. Properties are generally unimproved at intermediate concentration ranges.

When the combination coatings are in the form of superimposed layers (e.g., double-layer coatings), the hexa(alkoxymethyl)melamine/hydroxylated fluoropolymer compositions are used preferably as primer layers and the silica compositions preferably as topcoats. Such combinations are especially useful on polycarbonate, e.g., Lexan, or Merlon, and poly(ethylene terephthalate) films or sheets. The silica compositions have poor adhesion when applied directly to these substrates, but they have excellent adhesion when applied as topcoats on crosslinked hexa(alkoxymethyl)melamine/hydroxylated fluoropolymer primers. Solid plastic articles coated with (1) a crosslinked hexa(alkoxymethyl)melamine/hydroxylated fluoropolymer primer containing an ultraviolet absorber and (2) a silica-containing topcoat form aspects of the invention. Preferred coated plastics are acrylic and polycarbonate polymers in sheet form, especially poly(methyl methacrylate) sheeting as cast and biaxially oriented.

The coated substrates which comprise an important aspect of the invention are solid materials bearing surface coatings of any of the crosslinked hexa(alkoxyalkyl)melamine/hydroxylated fluoropolymer compositions described above. The solid materials may be plastics or metals and are preferably in sheet or panel form, i.e., having broad, smooth, relatively rigid, flat or curved surfaces, but may also be in the form of flexible films, thin sheets, or fibers or in the form of rigid, molded, machined or carved objects having complex non-planar surfaces. Solid materials which may be coated with the crosslinked compositions include any that are essentially unaffected by the coating solutions and the processes of application described above. Preferred plastic substrates are polyacrylates, polycarbonates, poly(ethylene terephthalate) and polychloral (either the homopolymer of the copending, coassigned Vogl application Ser. No. 508,569, filed Nov. 18, 1965, now U.S. Pat. No. 3,454,527, or the chloral-isocyanate and chloralketene copolymers of the Vogl application Ser. No. 731,622, filed May 23, 1968 now abandoned). Preferred metal substrates are aluminum, copper, iron and brass. In general, the coatings produced by the process of the invention will have a thickness on any of the substrates of about 0.2 to 20$\mu$ when clear, and of about 0.5 – 3.0 mils when pigmented.

Substrates coated according to this invention in general retain their normal utilities with improved properties. The transparent plastics, for example, remain transparent with greatly improved scratch resistance. Corrodible metals exhibit increased resistance to corrosion.

EMBODIMENTS OF THE INVENTION

There follow some nonlimiting examples illustrative of the invention in more detail. In these examples, temperatures are in degrees Celsius. Unless otherwise indicated, percentages are by weight. Many tests, including the wiping test, useful for evaluation of the coated panels, are summarized in the above-mentioned copending applications of Bechtold and Fawcett, Ser. No. 464,063 now U.S. Pat. No. 3,429,845, and Bechtold and Brasen, Ser. No. 464,064 now U.S. Pat. No. 3,429,846. A Scotch tape grid test for adhesion is described in U. S. Pat. No. 3,304,196.

EXAMPLE 1

(TETRAFLUOROETHYLENE/4-HYDROXYBUTYL VINYL ETHER)/HEXA(METHOXYMETHYL)MELAMINE ON POLY(METHYL METHACRYLATE

Part A

The copolymer is readily prepared by conventional methods (see, for example, Hanford et al., U. S. Pat. 2,468,664) as illustrated by the following: A 2-gallon reactor was charged with 5,500 cc. of t-butyl alcohol, 26 g. of anhydrous potassium carbonate, 330 g. of 4-hydroxybutyl vinyl ether, 0.9 g. of azodiisobutyronitrile, and 390 g. of tetrafluoroethylene and heated with stirring to 65° for 3.5 hours during which time the pressure fell from an initial value of about 140 psi to 55 psi. The copolymer was obtained as a viscous clear, colorless solution in the t-butyl alcohol having 11.0 percent solids content. A portion of the polymer was isolated by dilution with distilled water and after further washing with water and air drying there was obtained a white solid copolymer having an inherent viscosity (0.1 percent in dioxane at 25°) of 0.70, and a fluorine content of 35.78 percent (calcd. for 1:1 copolymer, 35.2 percent). The copolymer was soluble in methanol.

Part B

A coating solution was prepared by combining 70 g. of a 13.2 percent solution of 1/1 copolymer of tetrafluoroethylene and 4-hydroxybutyl vinyl ether in t-butyl alcohol, 20 g. of a 17.5 percent solution of commercial hexa(methoxymethyl)melamine in n-butyl alcohol, 30 g. of acetic acid, 0.069 g. of an organosilicone which is a block copolymer of one or more lower alkylene oxides with dimethyl siloxane (Union Carbide Corp. L-520 Silicone), and 0.207 g. of a methanol solution containing 17.2% p-toluenesulfonic acid and 8.7 percent morpholine.

Panels of poly(methyl methacrylate) were dipped into the above-described solution for 2 minutes, withdrawn at 6 inches/minute and baked for one hour at 135°. The coating produced was hard and transparent.

The coated panels had good resistance to scratching with number 0000 steel wool and the coating had fair adhesion to the substrate. The coatings, which were found to be ca. 6.7$\mu$ thick, showed 16 percent haze (ASTM D1003-61) after 300 rev. and 38.7 percent haze after 1000 rev. on the Taber abraser using CS10F wheels and 500 g. load per wheel (ASA Test Z 26.1–1950). In the falling silicon carbide test (ASTM D613-44), the initial haze increased from 0.77 to 1.9 percent after the panel was subjected to 1000 g. of silicon carbide grains falling 25 inches onto the panel. Coated panels rubbed with yellow laundry soap and stored at 100 percent relative humidity for 16 hours were unchanged visibly. Scratch resistance, as determined by mechanical wiping with a pad moistened with a paste of abrasive household cleaning powder and water, dropped from 92 percent to 85 percent after the soap treatment. Panels soaked in water at 60° for 2 hours showed a scratch resistance of 90 percent by the same test. Concentrated liquid household detergent, a full strength liquid ammoniated household cleaner, and 40 percent aqueous sodium hydroxide solution had no effect on the coated panels in 64 hours of contact. Saturated salt solutions had no effect on the coating in one hour at 60°. Glycol antifreeze, isopropyl alcohol, ethyl alcohol, motor oil, and 40 percent sulfuric acid were without effect in 16 hours at room temperature. The substrate was slightly swollen but the coating was not softened by methanol in 16 hours at room temperature. Acetone did not soften the coating but attacked the substrate to a greater degree than the methanol.

A partially coated panel was subjected to 2000 hours in the carbon arc Weather-Ometer (ASTM E-42-57). After this time the uncoated area had become hazy while the coated area remained unchanged visually although the steel wool scratch resistance had decreased.

Part C

A coating solution was prepared by combining 90 g. of a 15 percent solution of a 1/1 copolymer of tetrafluoroethylene and 4-hydroxybutyl vinyl ether in methanol with 28.5 g. of methyl isoamyl ketone, 27 g. of toluene, 4.5 g. of commercial hexa(methoxymethyl)melamine, 0.36 g. of a 27 percent solution of p-toluenesulfonic acid in isopropyl alcohol and 0.069 g. of L-520 silicone.

Panels of poly(methyl methacrylate) were dipped in the above-prepared solution for two minutes, withdrawn at 16 inches/minute, and baked for 60 minutes at 135°. The coated panels were clear and brilliant with essentially no optical defects. The thickness of the coating was 6.2μ. Steel wool (number 0000) scratch resistance was excellent and adhesion as measured by the tape pull test was 99–100 percent. Scratch resistance as determined by a wiping tester (see Bechtold and Brasen, Ser. No. 464,063 now U.S. Pat. 3,429,845), using a paste of water and an abrasive household cleanser, was 97 percent. A panel tested after immersion in water at 60° for 2 hours showed that adhesion of the coating was unchanged and scratch resistance by the wiping test had dropped slightly from 97 to 95 percent.

A coated panel exposed to the carbon arc Weather-Ometer for 1000 hours retained very good steel wool scratch resistance, but adhesion as measured by the tape pull test had dropped to 0 percent. Scratch resistance by the wiping test using a paste of abrasive household cleanser, was 70 percent. A second panel, after exposure in Arizona to 14 weeks of mirror concentrated solar radiation (452,300 langleys) plus periodic water sprays, showed very good-excellent steel wool scratch resistance, but adhesion had dropped to 0 percent. In both of these exposures, loss of adhesion is believed to be caused by degradation of the poly(methyl methacrylate) substrate at the interface with the coating.

Part D.

A solution was prepared by mixing 60 g. of a 22.9 percent solution of a copolymer of tetrafluoroethylene and 4-hydroxybutyl vinyl ether in methanol with 30 g. of acetic acid, 15 g. of methyl isoamyl ketone, 15 g. of toluene, 6.54 g. of hexa(methoxymethyl)melamine, 0.425 g. of a 20 percent solution of p-toluenesulfonic acid in isopropyl alcohol, and 0.069 g. of L-520 silicone. A panel of biaxially oriented poly(methyl methacrylate) sheet was flow coated with the thus-prepared solution and baked for 2 hours at 105°. The cured coating was clear and brilliant with very good-excellent steel wool scratch resistance and 100 percent adhesion by the tape pull test. The low cure temperature is of great advantage in this case, since the stretched acrylic sheet tends to retract to its original dimensions if temperatures as high as 135° are used.

EXAMPLE 2

POLY(ETHYLENE TEREPHTHALATE) SUBSTRATE

Strips of poly(ethylene terephthalate) film 0.005 inches thick were dipped in the solution of Example 1, Part D, for 2 minutes and withdrawn at 12 inches/minute. The strips were baked for 60 minutes at 135°. A clear, transparent coating was obtained. Steel wool scratch resistance was very good-excellent. Adhesion as measured by the tape pull test was 98–100 percent. The coating was 15–16μ thick.

EXAMPLE 3

POLYCARBONATE SUBSTRATE

A solution was prepared by mixing 87.5 g. of a 15.07 percent solution of tetrafluoroethylene/4-hydroxybutyl vinyl ether copolymer in methanol with 32.5 g. of acetic acid, 15 g. of methyl isoamyl ketone, 15 g. of toluene, 5.64 g. of hexa(methoxymethyl)melamine, 0.425 g. of a 20 percent solution of p-toluenesulfonic acid in isopropyl alcohol, and 0.069 g. of L-520 silicone. The coating was applied to a 0.125 inch thick sheet of polycarbonate resin by flow coating and baking 16.6 hours at 135°. The cured coating was clear and brilliant and had excellent steel wool scratch resistance. Adhesion was 100 percent. Solvent crazing of stressed surfaces was greatly retarded by the coating.

EXAMPLE 4

POLYCHLORAL (p-CHLOROPHENYL ISOCYANATE/ CHLORAL COPOLYMER) SUBSTRATE

Part A. Coating Solution

A 30/70 hexa(methoxymethyl)melamine/(tetrafluoroethylene/4-hydroxybutyl vinyl ether copolymer) coating composition was prepared by mixing a solution containing 118 g. of tetrafluoroethylene/4-hydroxybutyl vinyl ether copolymer and 532 g. of methanol with 140 g. of n-butyl alcohol, 140 g. of methyl isoamyl ketone, 140 g. of toluene, 280 g. of acetic acid, 50.4 g. of hexa(methoxymethyl)melamine, 4.0 g. of a 20 percent solution of p-toluenesulfonic acid in isopropyl alcohol, and 0.64 g. of L-520 silicone.

Part B. Coating

Transparent panels of a p-chlorophenyl isocyanate/chloral copolymer were immersed in methanol for 5–20 min., wiped dry, placed in the coating bath for 2 minutes, then withdrawn at 12 inches/minute. The coated panels were baked for 30 minutes at 135° to evaporate the solvent and cure the coating.

p-Chlorophenyl isocyanate/chloral copolymer is described and claimed in the above-mentioned copending, coassigned Vogl application Ser. No. 731,662. It was prepared as follows:

A casting cell ca. 6 × 9 × ⅛ inch was assembled from carefully cleaned and dried glass plates using a gum rubber tubing gasket generally as described in Schildknecht, *Vinyl and Related Polymers*, Wiley, New York, pp. 198–199 (1952). The assembly was heated to 60° under vacuum to dry it thoroughly and was kept warm until used.

A mixture of 140 ml. of freshly distilled chloral and 9.3 ml. of p-chlorophenyl isocyanate was heated under nitrogen to 55°. To the warm mixture of monomers was added 6 ml. of chloroform solution containing 30.8 g. of a 1/1 triisopropyl phosphine/chloral reaction product (prepared by direct addition of the monomers; compare Hoffman et al., *Angew. Chem.,Int. Ed. in English*, 3 737, 742 [1964]) per 100 ml. of solution.

By means of a warm, dry hypodermic syringe, the warm, initiated monomer mixture was transferred to the warm sheet mold to fill completely the space between the plates. The filled mold was then immersed in ice water until it was all but completely submerged, care being taken to avoid allowing water to enter into the cavity of the mold through the opening in the upper corner.

After standing one hour in the ice bath, the mold was removed and allowed to warm to room temperature overnight. The polymerized sheet was removed and allowed to soak in three changes of acetone at room temperature for 24 hours. The extracted sheet was then dried in vacuo for 24 hours at 55°.

Part C. Examination of Coated Panels

The coated area of the panels of Part B was visibly clearer and glossier than the uncoated portion. Light transmission of the coated area was 91.9 percent with 1.4 percent haze (ASTM D1003-61). After the falling silicon carbide test (ASTM D613-44) haze was 2.0 percent, an increase of only 0.6 percent. Light transmission at this stage was 90 percent. The coated surface had good scratch resistance to number 0000 steel wool also. The coefficient of friction of the coated surface was noticeably less than that of the uncoated surface (ca. 0.31 v. 0.43 for the uncoated surface as determined with a brass weight using a simple angle of repose measurement).

Attempts to clean greasy fingerprints from the uncoated surface of the chloral copolymer with a soft paper tissue left numerous fine scratches. In contrast, the coated surface showed no scratching whatever under the same treatment, and could even be cleaned without damage by specially treated paper tissues sold for cleaning glass spectacles (American Optical Co., "Magic Lens Tissues").

An important advantage of chloral polymers and copolymers is their nonflammability. The presence of the scratch-resistant coating on the polymer surface did not appear to influence flammability.

EXAMPLE 5

METAL SUBSTRATES

A coating solution similar to that used in Example 1, Part C, but containing ca. 15 percent acetic acid and ca. 3 percent p-toluenesulfonic acid on solids was applied to strips of aluminum, brass, copper and mild steel. The metal strips were first cleaned with steel wool and soap, and then rinsed with water, acetone and toluene. The dry strips were immersed in the coating solution, withdrawn at 12 inches/minute and baked at 135° for 60 minutes to give a dry coating 3–5μ thick.

The coated areas on the steel had a very slight amber tint, and those on the copper, a brownish tint, presumably because of some slight oxidation of the metal during the coating and curing operations. The coatings on the brass and aluminum were colorless. The steel wool scratch resistance of all the coating was very good-excellent; and tape pull adhesion was 98–100 percent except on the aluminum (0%). Good adhesion was obtained on aluminum by applying a prime coat of thermosetting acrylic lacquer before applying the hexa(methoxymethyl)melamine-hydroxylated fluoropolymer coating. After six months of exposure to a chemical laboratory atmosphere, the coated areas of the strips were unchanged, but the uncoated area of the steel strips were rusty and uncoated areas of the brass and copper strips were tarnished and dull.

EXAMPLE 6

VARYING PROPORTIONS IN THE COATING COMPOSITION

Coating compositions comprising hexa(methoxymethyl)-melamine and tetrafluoroethylene/4-hydroxybutyl vinyl ether (1/1) copolymer in ratios varying from 15/85 – 35/65 were prepared as indicated in the following table:

| Coating Solution | A | B | C | D | E |
|---|---|---|---|---|---|
| Fluoropolymer/Melamine Ratio | 85/15 | 80/20 | 75/25 | 70/30 | 65/35 |
| Copolymer Solution (14.65% in methanol) | 30 g. | 30 g. | 30 g. | 30 g. | 30 g. |
| Methyl isoamyl ketone | 5 | 5 | 5 | 5 | 5 |
| Toluene | 5 | 5 | 5 | 5 | 5 |
| Acetic acid | 10 | 10 | 10 | 10 | 10 |
| Hexa(methoxymethyl)melamine | 0.77 | 1.10 | 1.46 | 1.88 | 2.36 |
| p-toluenesolfonic acid solution (20% in isopropyl alcohol) | 0.11 | 0.11 | 0.12 | 0.125 | 0.135 |

Five strips of poly(methyl methacrylate) were coated with solution A by dipping a strip for 2 minutes, withdrawing at 12 inches/minute, and baking for 30 minutes at 135°. Solutions B–E were applied to 5 strips each in the same manner to give a total of 25 strips.

Steel wool scratch resistance and adhesion by tape pull test were determined on each side of all the strips. Results are shown below:

| Solution | Appearance | Steel Wool Scratch Resistance | Adhesion (Tape Pull) Range |
|---|---|---|---|
| A | Clear, slight orange peel* | Very good | 95–99% |
| B | " | Excellent | 95–99% |
| C | " | " | 98–99% |
| D | " | " | 98–99% |
| E | " | " | 85–99% |

* "Orange Peel" is the well known defect in which regularly spaced high and low spots on a coated surface give an appearance like that of an orange peel.

In order to reduce orange-peel defects, the above solutions were modified by addition of 0.025 g. of L-520 silicone to each. Solutions were then applied to a 4-inch wide strip of poly(methyl methacrylate) which had been wiped with methanol/toluene/methyl isoamyl ketone (6/2/2) mixture before coating. A hopper doctor knife with a clearance of 0.011 inch was used to apply the coating solutions. The coated strips were allowed to dry at room temperature for 15 minutes in a horizontal position and then suspended vertically in an over at 135° for 30 minutes. Appearance, steel wool scratch resistance and coating adhesion were found to be as follows:

| Solution | Appearance | Steel Wool Scratch Resistance | Adhesion |
|---|---|---|---|
| A | Clear-Smooth | Very Good-Excellent | 95–99% |
| B | " | Excellent | 98–99% |
| C | " | " | 80–95% |
| D | " | " | 0% |
| E | " | " | 0% |

The decline in adhesion obtained when solutions D and E were applied by doctoring rather than dipping is believed related to the somewhat thicker coatings obtained and resulting slower drying obtained.

Resistance to hot water was determined by immersing panels in 60° water for 2 hours and then noting appearance, resistance to scratching on wiping with an abrasive household cleaning powder, and tape pull adhesion. Results were as follows:

| Solution | Appearance | Steel Wool Scratch Resistance | Adhesion |
|---|---|---|---|
| A | No change | 95 | 95–99% |
| B | " | 95 | 99% |
| C | " | 97 | 98–99% |
| D | " | 97 | 0–70% |

| SOLUTION | | | |
|---|---|---|---|
| E | " | 97 | 0% |

The abrasion resistance of the coatings was determined by the falling silicon carbide test (ASTM D613–44). Results were as follows:

| | % HAZE* | | |
|---|---|---|---|
| SOLUTION | Before Test | After Test | Δ |
| A | 0.7 | 1.3 | 0.6 |
| B | 0.5 | 1.3 | 0.8 |
| C | 0.3 | 1.0 | 0.7 |
| D | 0.9 | 1.6 | 0.7 |
| E | 0.7 | 1.2 | 0.5 |

*Average of measurements on two panels.

Light transmission of the samples ranged from 91.0 to 93.0 percent before subjecting the panels to the falling carbide grains and 89.1 to 91.5 percent afterward.

The coatings were also found to be resistant to attack by a variety of chemical agents:

| Reagent | Conditions Used | Effect on Coatings |
|---|---|---|
| 2% solution of yellow laundry soap | 16 hours — 25° | None |
| Methanol antifreeze-full strength | 16 hours — 25° | No effect on scratch resistance Coatings A, B, D and E show slight swelling of substrate. |
| Saturated sea salt solution | 1 hour — 60° | None |
| Ammoniated household cleaner (full strength) | 1 hour — 25° | None |
| Acetone | 16 hours — 25° | Attacks all but E |

EXAMPLE 7

(TETRAFLUOROETHYLENE/4-HYDROXYBUTYL VINYL ETHER)/HEXA(CYCLOHEXYLOXYMETHYL)-MELAMINE

Part A. Preparation of Hexa(cyclohexyloxymethyl)-melamine

Hexa(cyclohexyloxymethyl)melamine was prepared by heating 140 g. (0.36 moles) of commercial hexa(methoxymethyl)-melamine with 237 g. (2.37 moles) of cyclohexanol and 0.2 g. of p-toluenesulfonic acid at 125° and 15 mm. of Hg pressure (water pump vacuum) under a short packed column until no more material distilled over. The viscous product weighed 289 g. (286 g. theory).

Part B. Coatings

To 30 grams of a 14.6 percent solution of tetrafluoroethylene/4-hydroxybutyl vinyl ether copolymer in methanol there was added 10 g. of acetic acid, 11.5 g. of a 40 percent solution of the above hexa(cyclohexyloxymethyl)melamine in acetone, 120 mg. of a 20 percent solution of p-toluenesulfonic acid in isopropyl alcohol, 5 g. of methyl isoamyl ketone and around 10 mg. of L-520 silicone. Strips of poly(methyl methacrylate) were dipped in the solution for 2 minutes, withdrawn at 12 inches/minute and baked for 1 hour at 150°. The coatings were clear and smooth. Steel wool scratch resistance was very good-excellent and adhesion as determined by the tape pull test was 98–99 percent. Neither appearance nor steel wool scratch resistance was changed by contact with 10 percent sodium hydroxide solution for 30 minutes.

EXAMPLE 8

HYDROXYLATED FLUOROPOLYMER/HEXA-(METHOXYMETHYL)MELAMINE

A series of hydroxylated fluoropolymers was combined with hexa(methoxymethyl)melamine and 0.4–0.8 percent by weight p-toluenesulfonic acid (on combined solids) in a largely alcohol-acetic acid solvent system to give coating solutions similar to those described above. Poly(methyl methacrylate) panels were dipped in the solutions for 2 minutes, withdrawn at 12 inches/minute and baked for 30 minutes at 135°. Copolymers employed in the coating solutions were as follows:

A. 1/1 tetrafluoroethylene/2-hydroxyethyl vinyl ether
B. 1/1 tetrafluoroethylene/2-hydroxypropyl vinyl ether
C. 1/1 tetrafluoroethylene/6-hydroxyhexyl vinyl ether
D. 1/2.4 hydrolyzed tetrafluoroethylene/vinyl acetate Details of the solutions used and rating of scratch-resistance and adhesion are shown in the following table:

| COATING | A | B | C | D |
|---|---|---|---|---|
| Fluoropolymer | 3.5 g. | 4.3 g. | 4.5 g. | 2.85 g. |
| Hexa(methoxymethyl)-melamine (Cymel 301) | 1.2 | 1.45 | 1.2 | 2.15 |
| Methanol | 15 | 27.2 | 33.5 | 24.95 |
| Acetic Acid | 10 | 10 | 10.8 | 10 |
| n-Butyl Alcohol | | 7 | | 10 |
| Methyl isoamyl ketone | 5.5 | | | |
| p-Toluenesulfonic acid solution (20% in isopropyl alcohol) | 0.1 | 0.25 | 0.14 | 0.2 |
| L-520 Silicone | | | 0.035 | |
| Scratch Resistance (Steel Wool) | Excellent | Excellent | V.good-excel. | Excellent |
| Adhesion | 100% | 100% | 20-95%* | 100% |

* Panels required cleaning with 60/20/20 methanol/toluene/methyl isoamyl ketone mixture before coating to obtain this adhesion.

The tetrafluoroethylene/hydroxyalkyl vinyl ether copolymers of this Example can be prepared in a manner similar to that described in Example 1, Part A. The hydroxyalkyl vinyl ether monomers may be prepared by known methods, for example the vinylation of the corresponding glycol with acetylene using an alkaline catalyst as described by Reppe, Ann. Chem. 601, 81 (1956). See also the above-mentioned Bechtold and Fawcett application Ser. No. 464,063 now U.S. Pat. 3,429,845.

For the preparation of the preformed hydrolyzed tetrafluoroethylene/vinyl acetate copolymer see the above-mentioned Bechtold and Brasen application Ser. No. 464,064 now U.S. Pat. 3,429,846.

EXAMPLE 9

STABILITY OF THE COATING SOLUTION

A series of coating solutions containing ca. 10–20 percent solids comprising (tetrafluoroethylene/4-hydroxybutyl vinyl ether)/hexa(methoxymethyl)melamine in 76/24–68/32 ratios and p-toluenesulfonic acid at ca. 0.4 percent (on solids) was examined for stability as judged by the time required for the solution to gel on standing. The compositions of the solutions are given in Table A, below. The relation-ship between the stability of the solution and the ratio of mols of primary alcohol in the solvent to mols of hydroxyl group in the dissolved polymer are clearly shown in Table B below. The effect of acetic acid in improving the stability is also evident.

resistance by rubbing with steel wool. The coated area remained bright and glossy while uncoated portions became dull and rough.

TABLE A

[Numbers represent grams]

| Solution | A | B | C | D | E | F | G | H | I | J | K | L |
|---|---|---|---|---|---|---|---|---|---|---|---|---|
| Tetrafluoroethylene/4-hydroxybutyl vinyl ether | 9.0 | 13.5 | 6.8 | 13.5 | 13.5 | 13.5 | 13.8 | 23.6 | 13.8 | 13.2 | 13.5 | 13.5 |
| Hexa(methoxymethyl)melamine | 3.0 | 4.5 | 2.2 | 4.5 | 4.5 | 4.5 | 6.5 | 10.2 | 6.5 | 5.6 | 4.5 | 4.5 |
| Methanol | | | 4.5 | 14.3 | 76.5 | 76.5 | 15.0 | 74.2 | 55.5 | 46.2 | 63.3 | 45 | 4.5 |
| n-Butyl alcohol | 7.4 | 127.5 | | | | | 11.5 | | | | 13.5 | 11.5 | 127.5 |
| Methyl Cellosolve® | | | | 37.4 | | | | | | | | | |
| t-Butyl alcohol | 57.6 | | | | | 90.5 | | | | | 90.5 | | |
| Acetic acid | | | | | | 15.0 | 30.0 | 30.0 | 30.0 | 30.0 | 30.0 | 45.0 | 75.0 |
| Methyl isoamyl ketone | | | 14.3 | 28.5 | 28.5 | | 15.0 | 15.0 | 15.0 | 15.0 | 15.0 | | |
| Toluene | | | | 27.0 | 27.0 | | 15.0 | 15.0 | 15.0 | 15.0 | | | |
| p-Toluenesulfonic acid solution (20% in isopropyl alcohol) | 0.240 | 0.360 | 0.180 | 0.360 | 0.360 | 0.360 | 0.425 | 0.700 | 0.425 | 0.425 | 0.360 | 0.360 |
| L-520 Silicone | 0.046 | 0.069 | 0.023 | 0.069 | 0.069 | 0.069 | 0.069 | 0.023 | 0.069 | 0.069 | 0.069 | 0.14 |

TABLE B

| Solution No. | % Acetic Acid | Moles Primary Alcohol in solvent per Mole OH in Polymer | Gel Time |
|---|---|---|---|
| A | 0 | 2.4 | 1 hour* |
| B | 0 | 30 | 1 day** |
| C | 0 | 30 | less than 2 weeks |
| D | 0 | 38 | over 2 weeks |
| E | 0 | 38 | over 3 weeks |
| F | 10 | 10 | 1 day |
| G | 19 | 36 | over 7 weeks |
| H | 20 | 16 | 1 day* |
| I | 24 | 23 | 2 weeks* |
| J | 19 | 35 | over 8 weeks*** |
| K | 21 | 25 | over 6 weeks |
| L | 35 | 30 | over 7 weeks |

\* Gelation reversed by addition of methanol
\** Gelation reversed by addition of acetic acid
\*** Composite solutions of this general type were still fluid after 7 months.

EXAMPLE 10

USE OF CURING CATALYSTS ACTIVE AT ROOM TEMPERATURE

Part A. Coating Solution By the use of very active catalysts such as hydrochloric acid, coatings of the hydroxylated fluoropolymer/-hexa(methoxymethyl)melamine compositions can be cured at room temperature as they dry.

A composition was prepared by mixing 50 g. of a 14.6 percent solution of tetrafluoroethylene/4-hydroxybutyl vinyl ether copolymer in methanol with 22 g. of methanol, 22 g. of acetic acid, 3.2 g. of hexa(methoxymethyl)melamine, 16 g. of n-butyl alcohol mixed with 0.6 cc. of concentrated hydrochloric acid, and 0.050 g. of L-520 silicone. Poly(methylmethacrylate) strips were dipped in this composition, removed and allowed to stand overnight at room temperature. The resulting products had a hard glossy coating that showed good resistance to scratching with steel wool, although adhesion of the coating was deficient as measured by the tape pull test.

Part B. Coatings

A portion of the coating solution from Part A was applied by brushing onto a steel panel coated with a black pigmented acrylic automotive finish. The coating levelled well as it dried. After standing for three days at room temperature, the coating was tested for scratch

EXAMPLE 11

(TETRAFLUOROETHYLENE/3-BUTENE-1-OL)/HEXA(METHOXYMETHYL)MELAMINE

Part A. 3-Butene-1-ol Copolymer

A 400 cc. stainless steel shaker tube was charged with 20.0 g. of 3-butene-1-ol, 150 ml. of water and 0.5 g. benzoyl peroxide. The tube was sealed, cooled and evacuated. Tetrafluoroethylene (60 g.) was added and the temperature raised to 80° while the pressure was increased to 950–1000 atmospheres by water injection. These conditions were maintained for 10 hours.

There was obtained 8.85 g. of a white solid, $\eta = 0.15$ (0.1 percent solution in ethanol at 25°), having a fluorine content of 47.88 percent corresponding to a mole ratio of tetrafluoroethylene/3-butene-1-ol of about 1.25/1. The polymer had a glass transition temperature at 22° and decomposed at 460°.

A 26.3 percent solids solution in ethanol was prepared.

Part B. Coatings

A coating solution was prepared by mixing 9.4 g. of 15 percent hexa(methoxymethyl)melamine in n-butyl alcohol, 6.9 g. of acetic acid, 0.023 g. of L-520 silicone, 18.0 g. of the above-prepared tetrafluoroethylene/3-butene-1-ol copolymer solution (26.3 percent in ethanol) and 0.12 g. of a 20 percent solution of p-toluenesulfonic acid in isopropyl alcohol.

Panels of poly(methyl methacrylate) were dipped in the solution prepared above, air dried, and cured for 30 minutes at 170°. Clear, scratch-resistant coatings, 2.9μ thick, were obtained. These coatings would withstand one hour's contact with boiling water or 65 hours' contact with yellow laundry soap under conditions of 100 percent relative humidity at room temperature without appreciable decline in scratch resistance or adhesion.

EXAMPLE 12

(TETRAFLUOROETHYLENE/ALLYL ALCOHOL)/HEXA(METHOXYMETHYL)MELAMINE

Part A. Tetrafluoroethylene/Allyl Alcohol Copolymer

Following the procedure of Engelhardt Ser. No. 583,072, a charge of 60 g. of allyl acetate, 150 ml. of distilled water, and 0.25 g. of benzoyl peroxide was loaded into a stainless steel shaker tube and the tube capped, cooled and evacuated. Tetrafluoroethylene, 60 g., was added and the temperature raised to 75° while the internal pressure was raised to 950–1000 atmospheres by water injection. These conditions were maintained for 12 hours. There was obtained 66.5 g. of a white taffy-like polymer having a fluorine content of 33.79 percent and an inherent viscosity $\eta = 0.12$ (0.1 percent solution in n-butanol containing 0.8 percent 2N HCl at 25°).

The polymer was dissolved in anhydrous methanol and charged to a simple distillation apparatus. A gas inlet tube was provided in the distilling flask, and small amounts of anhydrous hydrogen chloride were added. The contents of the flask were heated to reflux and methyl acetate, formed by transesterification, distilled until only traces of ester could be detected in the distillate by gas chromatography. The polymer was precipitated by pouring the methanolic solution into water and stirring. The white solid was washed with water and dried in vacuo at 40°.

The fluorine content of the hydrolyzed copolymer (39.72 percent) indicated approximately four atoms of fluorine for a molecular weight of 191, or about 1.56 moles of allyl alcohol per mole of tetrafluoroethylene. The polymer had $\eta = 0.36$ (0.1 percent solution in n-butanol containing 0.8 percent 2N HCl at 25°) and was soluble in lower alcohols. Differential thermal analysis indicated that the polymer had a glass transition temperature at 48° and decomposed at 390°–450°.

The polymer was dissolved in ethanol to give a solution containing 31.3 percent solids.

Part B. Coatings

A coating solution was prepared by combining 55.2 g. of a 15 percent solution of hexa(methoxymethyl)-melamine in n-butyl alcohol, 30 g. of acetic acid, 0.069 g. of L-520 Silicone, 64.8 g. of a 31.3 percent solution of the above-prepared tetrafluorethylene/allyl alcohol copolymer in ethanol, and 0.57 g. of a 20 percent solution of p-toluenesulfonic acid in isopropyl alcohol. Poly(methyl methacrylate) panels were dip coated, air dried and cured at 170° for 30 minutes. Clear, adherent coatings, 4.2$\mu$ thick, were obtained. These had excellent steel wool scratch resistance. The coating was essentially unaffected by 2 hours in 60° water, retaining both adhesion and scratch resistance.

EXAMPLE 13

SILICA-CONTAINING COATINGS

A coating solution containing the tetrafluoroethylene/allyl alcohol copolymer, hexa(methoxymethyl)-melamine, and silica in the weight ratio 67.5/27.5/5 was prepared by adding to 146 g. of the coating solution from Part B of Example 12, 9.7 g. of a hydrolyzed ethyl silicate composition made by mixing 100 g. of tetraethyl orthosilicate with 69.5 g. of anhydrous ethanol and 22.5 g. of 0.1 normal hydrochloric acid and aging 24 hours prior to use.

Poly(methyl methacrylate) panels were dipped in the prepared coating solution and cured for 30 minutes at 170° as before. Clear, adherent coatings 4$\mu$ thick and having excellent steel wool scratch resistance were obtained. The panels were resistant to 60° water for 2 hours, showing essentially no decline in scratch resistance or adhesion.

EXAMPLE 14

PRIMER COATINGS

A hydrolyzed ethyl silicate solution was prepared by treating 100 g. of tetraethyl orthosilicate with 69.5 g. of anhydrous ethanol and 22.5 g. of 0.1 normal hydrochloric acid. After aging 24 days, a 120 g. portion of this solution was mixed with 102 g. of methyl isoamyl ketone and heated at 32° under reduced pressure until the weight of the residue was 120 g. By this procedure, most of the ethanol was removed leaving a solution of polysilicic acid in methyl isoamyl ketone. The silica content was calculated to be 15 percent.

A 60/40 (tetrafluoroethylene/4-hydroxybutyl vinyl ether)/silica coating composition was prepared by mixing 20 g. of the above polysilicic acid solution with 16.4 g. of tetrahydrofuran and 13.6 g. of a 33 percent solution of the hydroxylated fluoropolymer in methanol.

Panels of polycarbonate resin were dipped for 2 minutes in a tetrafluoroethylene/4-hydroxybutyl vinyl ether)/hexa(methoxymethyl)melamine solution identical to that of Example 6, Part D, withdrawn at 12 inches/minute and baked for 10 minutes at 150° to provide a primer coat. After cooling, the panels were dipped for 2 minutes in the 40/60 silica/copolymer solution prepared above, withdrawn at 12 inches/minute and baked 60 minutes at 150°. Unprimed polycarbonate panels were also coated with the silica mix and the coating cured in the same manner.

The coating on the unprimed panels was hazy and mottled and, although steel wool scratch resistance was excellent, the adhesion was 0 percent. The coating on the primed panels was clear and brilliant with 100 percent adhesion. The steel wool scratch resistance was outstanding. A pad of number 0 steel wool rubbed over the coated panel with a force of 790 g./cm.$^2$ caused no scratch whatever.

EXAMPLE 15

ULTRAVIOLET ABSORBERS

Coating solutions were prepared as follows:

A. Fifty-five grams of a 17.3 percent solution of tetrafluoroethylene/4-hydroxybutyl vinyl ether copolymer in methanol was mixed with 34.5 g. of n-butyl alcohol, 30 g. of methyl isoamyl ketone, 30 g. of acetic acid, 1.05 g. of hexa(methoxymethyl)melamine, 0.220 g. of a 20 percent solution of p-toluenesulfonic acid in isopropyl alcohol, and 0.069 g. of L-520 silicone. An excess of the ultraviolet light absorber, 2(2'-hydroxy-5'-methylphenyl)benzotriazole, was then mixed with half of the above solution to give a saturated solution of the ultraviolet absorber in the solution. After removal of the excess triazole, the saturated solution was diluted with the rest of the original coating solution to reduce the concentration of the ultraviolet absorber.

B. A 60/40 (tetrafluoroethylene/4-hydroxybutyl vinyl ether)/SiO$_2$ composition was prepared by mixing 40 g. of polysilicic acid solution (a mixture of 100 g. of ethyl silicate, 47 g. of ethanol and 45 g. of 0.1N HCl aged for 24 hours) with 77 g. of a solution of tetrafluoroethylene/-4-hydroxybutyl vinyl ether copolymer (11.7 percent in 90/10 t-butyl alcohol/n-butyl alcohol), 33 g. of acetic acid, and 0.069 g. of L-520 silicone.

A poly(methyl methacrylate) panel was flow coated by pouring solution A onto the panel and draining off the excess with the panel in a vertical position. This primer coating was cured by heating at 130° for 30 minutes. The prime-coated panel was then top coated with solution B, applied by flow coating and cured by heating at 135° for 60 minutes. Another poly(methyl methacrylate) panel was single-coated directly with solution B and cured for 60 minutes at 135° for comparison with the double-coated panel.

The panels were exposed under two 15-watt tubular germicidal lamps at a distance of ca. three-eighths inch for 15 hours. Adhesion of the scratch resistant silica coating to the double-coated panel in the irradiated area was excellent over the primed portion as measured by the tape pull test. However, adhesion of the silica coating in the irradiated area on the single-coated panel was poor. In this area on the single-coated panel, the tape removed the silica coating together with a thin layer of the underlying poly(methyl methacrylate), which had been degraded to such an extent by the ultraviolet radiation that it had lost most of its strength. The screening action of the hexa(methoxymethyl)melamine plus the ultraviolet absorber prevented this degradation of the poly(methyl methacrylate) in the double-coated panel and thus prevented loss of adhesion.

EXAMPLE 16
PIGMENTED COATING

A mill base of TiO$_2$ in hexa(methoxymethyl)melamine, having a pigment to binder ratio of 333/100, was prepared by grinding the following charge in an 8-ounce wide-mouth glass jar for 16 hours:

| | |
|---|---|
| Hexa(methoxymethyl)melamine (Cymel 301) | 16.5 g. |
| Ethyl alcohol (2B) | 49.5 |
| TiO$_2$ pigment | 55.0 |
| Glass beads (8 mm.) | 188 |
| A clear resin solution was prepared as follows: | |
| Tetrafluoroethylene/4-hydroxybutyl vinyl ether copolymer solution (30.3% in n-butanol) | 76.66 g. |
| Hexa(methoxymethyl)melamine (Cymel 301) | 4.98 |
| p-Toluenesulfonic acid solution (20% in isopropyl alcohol) | 0.75 |
| n-Butanol | 9.92 |
| Ethyl alcohol (2B) | 16.74 |

A blender was charged with 33.00 g. of the mill base, cooled in an ice bath, and 98.58 g. of the clear resin solution added slowly. To this mix was added 0.2 g. of L-520 silicone. After being stirred in the cold for 15 minutes, the enamel was filtered through felt and muslin. The mix was homogeneous and moderately viscous with a total solids content of 34.2 percent The enamel was applied to 20-gauge Bonderite 37-treated steel carrying a 0.4 mil layer of an automotive sheet metal primer based on a soya alkyd/epoxy vehicle and baked 30 minutes at 149°. The topcoat thickness was 1.9–2.1 mils. The coating was not scratched by rubbing with number 0000 steel wool and showed good resistance to flying gravel. Adhesion as determined by the Scotch tape test was excellent, and the coating was resistant to water spotting at high temperature.

EXAMPLE 17
(CHLOROTRIFLUOROETHYLENE/4-HYDROXYBUTYL VINYL ETHER)/HEXA(METHOXYMETHYL)MELAMINE

A chlorotrifluoroethylene/4-hydroxybutyl vinyl ether copolymer was prepared by heating 25 g. of chlorotrifluoroethylene and 17 g. of 4-hydroxybutyl vinyl ether in 250 ml. of t-butyl alcohol with 1 g. of potassium carbonate and 0.04 g. of azodiisobutyronitrile for 8 hours at 65° in a closed vessel. The copolymer was precipitated from solution by addition of water and dried to give 37 g. of white solid which analyzed 16.57 percent Cl and 22.91 percent F.

A coating solution was prepared by combining 17 g. of a 13.13 percent solution of the above polymer in methanol with 3.0 g. of methyl isoamyl ketone, 3.0 g. of toluene, 6.0 g. of acetic acid, 0.95 g. of hexa(methoxymethyl)melamine, 0.070 g. of a 20 percent solution of p-toluenesulfonic acid in isopropyl alcohol and approximately 5 mg. of L-520 silicone. Poly(methyl methacrylate) strips were dipped in the coating solution for 2 minutes and withdrawn with 12 inches per minute. One series was baked for 30 minutes at 135°, a second, 60 minutes at 135°, and a third, 30 minutes at 150°.

All the strips, after baking, were clear and brilliant and showed very good steel wool scratch resistance (number 0000 steel wool) and excellent adhesion of the coating to the substrate as determined by the tape pull test.

Since obvious modifications and equivalents in the invention will be evident to those skilled in the chemical arts, I propose to be bound solely by the appended claims.

I claim:

1. A transparent plastic sheet coated with an adherent coating of a crosslinked polymer comprising chains of a preformed fluoropolymer which is a copolymer of a fluoroolefin with a member of the group consisting of hydroxyalkyl vinyl ether, olefinic alcohol and hydrolyzable ester of an olefinic alcohol, said ester being hydrolyzed after polymerization with the fluoroolefin, said fluoropolymer carrying a plurality of hydroxyl groups each of which is attached to a carbon atom carrying at least one hydrogen, said fluoropolymer having a unit weight no greater than 700 per hydroxyl group and containing at least about 20 percent by weight of fluorine, the fluorine atoms being attached to the main chain carbons of the fluoropolymer, cross-linked by means of a crosslinking agent of the formula

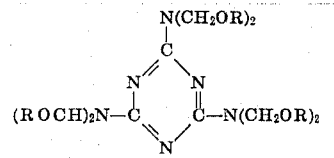

wherein R is alkyl or cycloalkyl of up to 8 carbon atoms, the mole ratio of crosslinking agent to hydroxyl group being 1/34 – ½.

2. A coated sheet according to claim 1 wherein the transparent plastic sheet is an acrylic polymer.

3. A coated sheet according to claim 1 wherein the transparent plastic sheet is a poly(ethylene terephthalate).

4. A coated sheet according to claim 1 wherein the transparent plastic sheet is a polycarbonate.

5. A coated sheet according to claim 1 wherein the transparent plastic sheet is a polychloral.

6. The coated sheet according to claim 1 in which the crosslinked coating has a top coating of a silica-containing hydroxylated fluoropolymer.

7. A corrodible metal coated with an adherent coating of a crosslinked polymer comprising chains of 1) a preformed fluoropolymer which is a copolymer of a fluoroolefin with a member of the group consisting of hydroxyalkyl vinyl ether, olefinic alcohol and hydrolyzable ester of an olefinic alcohol, said ester being hydrolyzed after polymerization with the fluoroolefin, said fluoropolymer carrying a plurality of hydroxyl groups each of which is attached to a carbon atom carrying at least one hydrogen, said fluoropolymer having a unit weight greater than 700 per hydroxyl group and containing at least about 20 percent by weight of fluorine, the fluorine atoms being attached to the main chain carbons of the fluoropolymer, and 2) a crosslinking agent of the formula

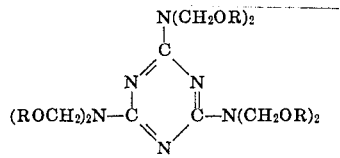

wherein R is alkyl or cycloalkyl of up to 8 carbon atoms.

* * * * *